Nov. 28, 1933.　　F. S. RIPPINGILLE　　1,937,358
SHOCK ABSORBER
Filed Oct. 25, 1932　　2 Sheets-Sheet 1

INVENTOR
FRANK SIDEBOTHAM RIPPINGILLE
BY Oscar A. Geier
ATTORNEY

Nov. 28, 1933.    F. S. RIPPINGILLE    1,937,358
SHOCK ABSORBER
Filed Oct. 25, 1932    2 Sheets-Sheet 2
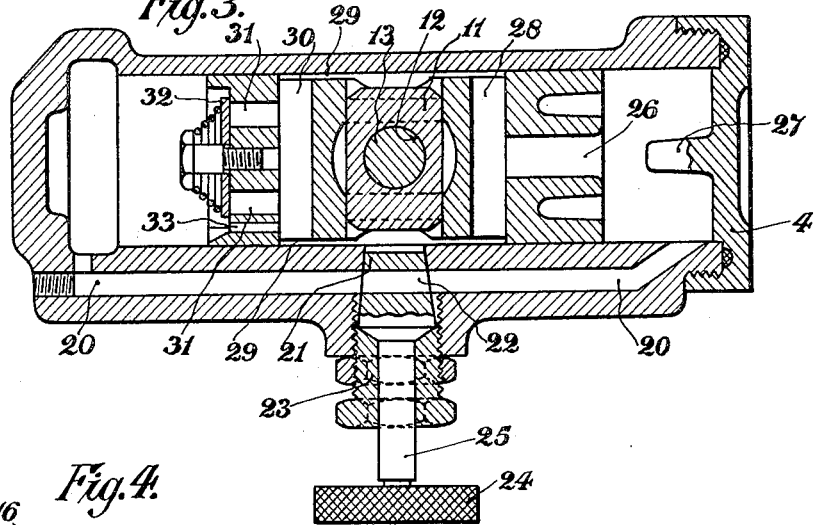
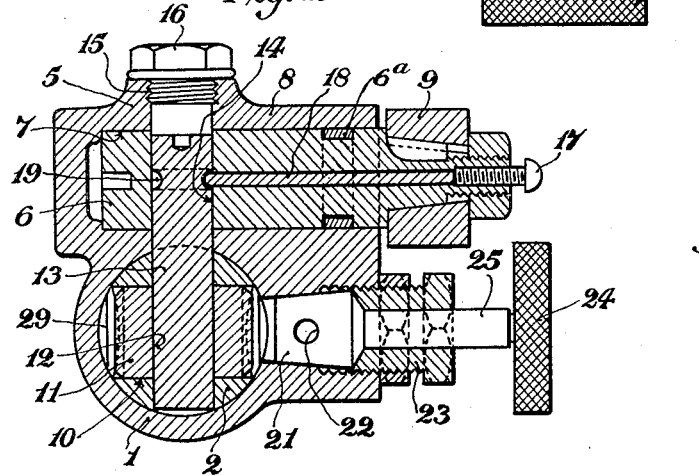
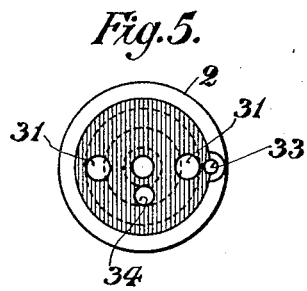
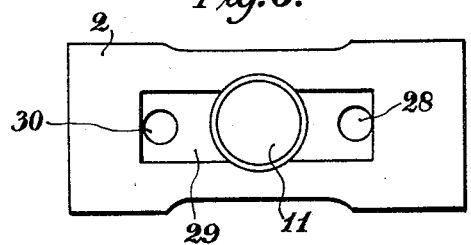
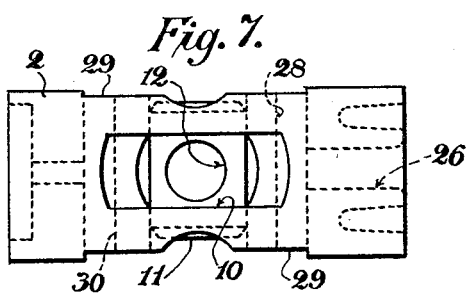
INVENTOR
FRANK SIDEBOTHAM RIPPINGILLE
BY Oscar A. Geis
ATTORNEY Patented Nov. 28, 1933

1,937,358

UNITED STATES PATENT OFFICE 1,937,358

SHOCK ABSORBER

Frank Sidebotham Rippingille, Birmingham, England, assignor of one-half to Guy Lloyd Horton, Birmingham, England Application October 25, 1932, Serial No. 639,420, and in Great Britain October 29, 1931

7 Claims. (Cl. 188—88)

This invention relates to shock absorbers or vibration dampers for use on motor vehicles or for other purposes, the said shock absorbers or vibration dampers being of the fluid-friction type comprising a reciprocating piston working in a fluid-containing cylinder and operated from a rock-shaft by an external angularly-movable arm so as to force the fluid through restricted passages or apertures in order to give the desired damping action.

One of the objects of the invention is to provide a simple but efficient construction of shock absorber which admits of being readily and cheaply manufactured and easily assembled; which comprises a minimum of separate parts; and in which possibility of leakage of fluid is reduced to a minimum.

Another object is to provide simplified means for progressively cushioning the piston at one end of its free or return stroke in order to exert a controlling action on the vehicle wheel or like part towards the end of the unresisted movement of the said part.

Figure 1 of the accompanying drawings is a longitudinal vertical section through a shock absorber for a motor vehicle in accordance with the present invention, the piston being shown in its mid position.

Figure 3 is a horizontal section through the shock absorber.

Figure 4 represents a transverse section on line 4—4, Figure 1.

Figure 5 is an end view of the piston with the plate valve removed.

Figure 6 is a side view of the piston.

Figure 7 is a plan of the piston.

Figure 1:
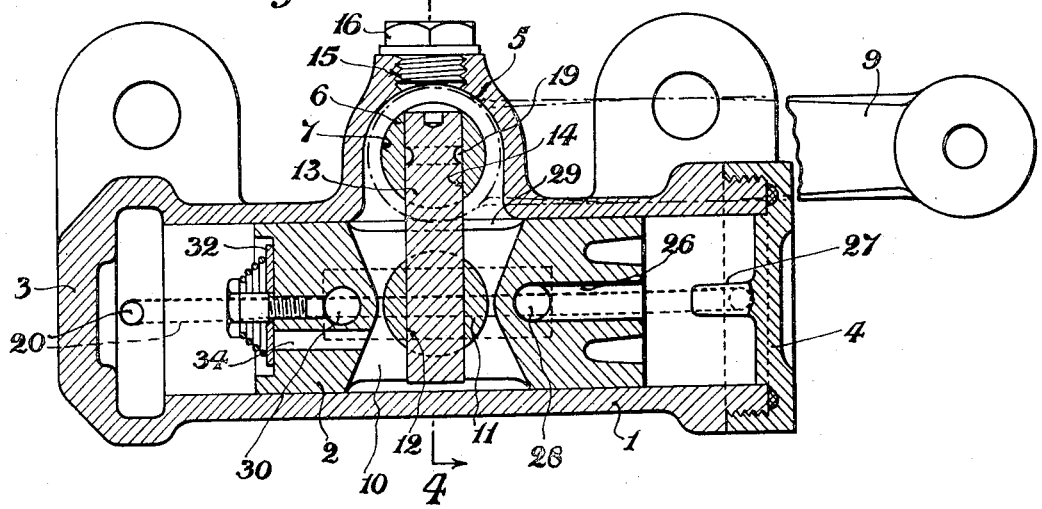

The shock absorber for use on a motor vehicle, as shown in the above drawings, comprises a horizontal cylinder 1 containing a reciprocating piston 2 and adapted to be filled with a suitable fluid. The said cylinder may consist of a casting, or a combination tube and casting, or a stamping, and has one end 3 permanently closed, this end being integral with the body walls, while the opposite end is open but is adapted to be closed by a screwed-on cap or plate 4 which is fitted in place after the piston has been inserted into the cylinder through the said open end. The said cylinder 1 is formed mid-way along its top wall with an upwardly projecting housing or chamber 5 which is integral with the wall of the cylinder and the interior of which is open to the interior of the cylinder. The said housing or chamber 5 constitutes a low pressure reserve fluid chamber, and contains a transverse rock-shaft 6 from which the piston is operated. For this latter purpose one side of the housing is solid or unapertured (see Figure 4) but is provided with a bearing recess 7 in its inner face to support one end of the rock-shaft, which latter extends across the housing and out to the exterior through a sleeve bearing extension 8 at the opposite side of the housing and is fitted with a packing 6a located in a circumferential groove. The projecting end of the shaft 6 has fixed to it an operating arm 9 adapted to be connected to the vehicle axle if the cylinder is fixed to the vehicle body, or vice-versa. The piston 2 within the cylinder has a central vertical slot 10 which always remains in communication with the rock-shaft housing 5; and pivotally mounted in the sides of the piston so as to cross the slot 10 is a gudgeon pin 11 having a transverse hole 12. The gudgeon pin is operatively connected to the rock-shaft 6 by means of an arm 13 fixed tightly at its upper end (which may be tapered) in a transverse hole 14 in the rock-shaft 6 and whose lower end has a sliding fit in the hole 12 in the gudgeon pin. To enable the said arm to be fitted after assembly of the piston and rock-shaft, an aperture 15 is provided in the top of the rock-shaft housing through which the said arm 13 can be inserted and tightly driven through the said rock-shaft 6 so that its lower end passes through the hole in the gudgeon pin. The said aperture 15, which also serves for filling the cylinder with fluid, is afterwards closed by means of a screw-plug 16. The said arm 13 is positively secured to the rock-shaft 6 by a screw 17 (Figure 4) which is screwed into the end of the rock-shaft and forces a sliding pin 18 into a groove 19 around the upper end of the arm 13.

It will be seen that as the external operating arm 9 is moved angularly, the piston 2 will be caused to reciprocate within the cylinder and to act upon the fluid therein. To give the desired damping action, the wall of the cylinder is provided with a longitudinal passage 20 opening into opposite ends of the cylinder on opposite sides of the piston, and through which the fluid is caused to flow from one side of the piston to the other as the piston reciprocates towards the left. Fitted across this passage is a resistance regulating device which may conveniently consist of a rotary plug 21 having a through passage 22 adapted, by the rotation of the plug, to be turned more or less into line with the passage 20 in order to vary the effective size of the passage and thus the resistance offered to the flow of the fluid through the said passage. The said plug may turn in a bush 23 screwed into an opening formed in the wall of the cylinder, and the plug may be operated by a knob 24 on a spindle 25 carried by the plug. Instead of a rotary plug, however, any means for regulating or determining the effective size of the passage 20 may be provided. In the rear or right-hand end of the piston 2 is an axial passage 26 adapted to co-operate with a central taper peg 27 on the end cap 4, for a purpose hereinafter described. The passage 26 leads into a transverse passage 28 the opposite ends of which lead into longitudinal recesses 29, 29, formed in opposite side walls of the piston, said recesses being isolated from the central slot 10. At the other end of the piston another transverse passage 30 is provided connecting the two side recesses 29, 29, and from this transverse passage 30 two longitudinal passages 31, 31, of large bore lead to the end face of the piston. Mounted upon this end face so as normally to cover the said longitudinal passages is a spring-pressed plate valve 32, while outside the area of this valve another longitudinal passage 33, of small bore, leads into the said transverse passages 30 (see Figure 3). There is another passage 34 leading from the central slot 10 to the left-hand face of the piston, its end being normally closed by the valve 32.

Figure 2:
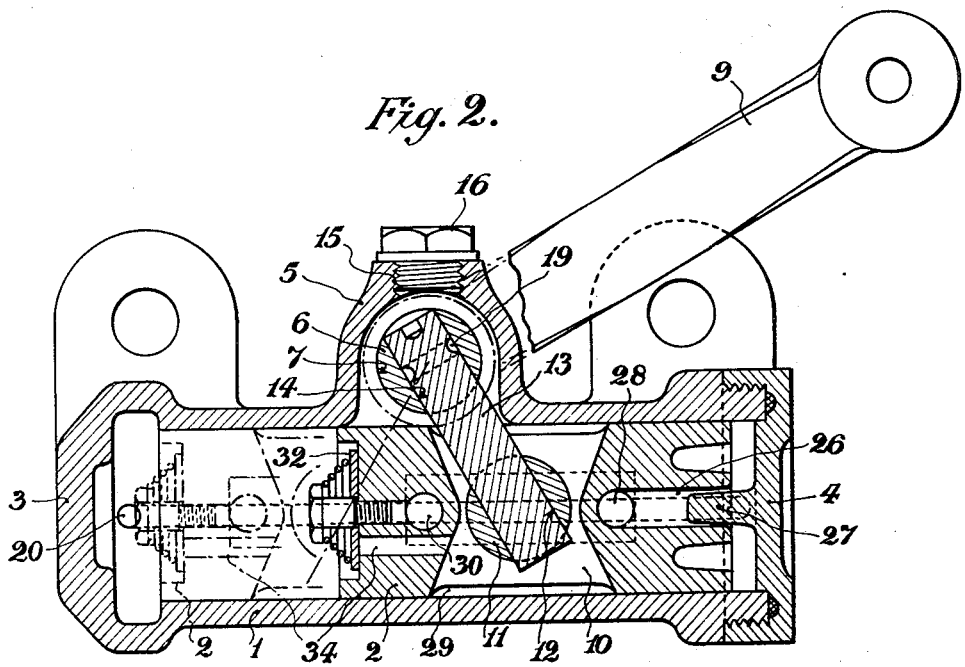
Figure 2 is a similar view showing the piston at the right-hand end of its stroke.

In operation, when the piston moves towards the left the valve 32 maintains the passages 31 closed and fluid is forced through the passage 20 in the cylinder wall, and also through the small-bore passage 33 which is outside the valve 32. Both passages 20 and 33 offer considerable resistance to the flow of the fluid, thus giving the desired damping action, and the resultant resistance to the flow may be regulated by means of the rotary plug 21. From the passage 20 the fluid passes directly into the rear end of the cylinder, and from passage 33 it passes through passage 30, side recesses 29, passage 28 and thence through axial passage 26 into the rear end of the cylinder. When the piston moves towards the right the plate valve 32 opens, and the fluid passes freely from the rear to the forward end of the cylinder by way of the rear axial passage 26, rear transverse passage 28, side recesses 29, front transverse passage 30 and large-bore longitudinal passages 31, so that substantially no resistance is offered to this return movement of the piston during the greater part of the stroke. In order, however, to cushion the last portion of the stroke of the piston towards the right, the taper peg 27 co-operates with and enters the passage 26, as shown in Figure 2, and so restricts the effective size of the said passage, the fluid being compelled to pass through a progressively decreasing orifice. The cylinder can be replenished with fluid from chamber 5, during movement of the piston to the right, through passage 34, the valve 32 opening during the said movement. During the forward or damping stroke of the piston this passage 34 is maintained closed by the valve.

It is to be understood that, with the cylinder being on the chassis and the arm 9 connected to the axle, the piston 2 is normally in a mid position as shown in Figure 1, and when the vehicle wheel falls relatively to the chassis the piston moves to the left and sets up a damping action, while during the rising of the wheel, both towards and above the normal position, no appreciable resistance, or a reduced resistance, to such movement is offered until the piston has nearly reached the end of its return stroke when a cushioning effect is obtained by the peg or projection 27 on the cylinder end cap, so as to prevent the wheel being lifted off the ground by reason of its momentum. The downward-movement of the wheel from its highest position is then damped towards and beyond its normal position.

If desired, the passage 33 in the piston may be dispensed with, and the resistance obtained entirely by passage 20 and the plug 21 or other regulating device; or, alternatively, the passage 20 may be dispensed with and the resistance obtained solely by passage 33 or by two or more similar passages in the piston.

If desired, a recess or longitudinal passage 29 may be provided at one side only of the piston; also, there may be only one passage 31 leading from transverse passage 30 to the end of the piston.

Having fully described my invention, what I desire to claim and secure by Letters Patent is:—

1. A shock absorber or vibration damper comprising a fluid-containing cylinder, a reciprocating piston in said cylinder, a rock-shaft, means for actuating the rock-shaft, means for operatively connecting the rock-shaft to the piston, means whereby the piston is retarded during its entire length of stroke in one direction, means whereby the said piston has a substantially unretarded movement during its return stroke in the opposite direction until it approaches the end of the said return stroke, and means whereby the movement of the said piston is progressively cushioned or retarded during the last portion only of the said return stroke.

2. A shock-absorber or vibration damper comprising, in combination with a fluid-containing cylinder provided with a low-pressure filling chamber or reserve fluid reservoir, a piston in the cylinder having a recess or opening communicating with the said filling chamber or reservoir and provided with a longitudinal lateral passage isolated from said recess or opening and communicating at opposite ends with two transverse passages one of which is in communication with one end of the piston by means of an open longitudinal passage while the other transverse passage communicates by a longitudinal passage with the opposite end of the piston, the said piston also having a passage from the recess to one end, a rock-shaft, an operating arm thereon engaging the recess or opening in the piston and operatively connected to said piston, a projection on one end of the cylinder co-operating with the longitudinal passage at one end of the piston to give a progressive cushioning action during movement of the piston towards the said end of the cylinder, valve means controlling the longitudinal passage at the other end of the piston and also the passage from the recess so as to close said passages while the piston moves away from the end of the cylinder which is provided with the projection but opening the said passages during the return movement of the piston in the opposite direction, and a resistance passage through which the fluid is forced by the piston to give a damping action when the piston moves in the direction which causes the said valve to close.

3. A shock obsorber or vibration damper comprising, in combination with a fluid-containing cylinder provided with a low-pressure filling chamber or reservoir; a piston in said cylinder; a rock shaft; an arm on said rock-shaft operatively connected to the piston, said piston having a recess or opening engaged by said arm and communicating with the reservoir, a passage from said recess or opening to one end of the piston, and a longitudinal lateral passage isolated from said recess or opening and communicating at opposite ends with two transverse passages one of which is in communication with one end of the piston by means of an open longitudinal passage while the other communicates by a longitudinal passage with the opposite end of the piston; a projection on one end of the cylinder co-operating with the open longitudinal passage at one end of the piston to give a progressive cushioning action during movement of the piston towards the said end of the cylinder, a single spring-pressed plate valve mounted upon the end of the piston which is remote from that which co-operates with the projection on the cylinder and adapted to close the longitudinal passage at said end of the piston and also the passage leading from the recess or opening in the piston during movement of the piston in one direction, but opening the said passages during movement in the opposite direction, and means whereby the piston is retarded by the fluid throughout its movement in the direction in which the said valve closes the said passages.

4. A shock absorber or vibration damper comprising, in combination with a fluid-containing cylinder provided with a low-pressure reservoir and having a resistance passage in its wall opening into opposite ends of the cylinder, a projection on one end of the cylinder extending axially into the said cylinder, a rock shaft, an arm on the rock shaft, a piston in the cylinder operatively connected to the arm and having a recess which is engaged by said arm and which communicates with the reservoir, said piston also having a longitudinal lateral passage isolated from said recess and communicating at opposite ends with two transverse passages one of which is in communication with one end of the piston by means of an open longitudinal passage while the other communicates by a longitudinal passage with the opposite end of the piston, the said open passage co-operating with the projection on the end of the cylinder to give a gradually diminishing passage for the fluid and thus a progressive cushioning action during movement of the piston towards the said end of the cylinder, the piston also having a passage leading from the recess in it to the end of the piston remote from the end that co-operates with the projection on the cylinder, and valve means controlling the said passage from the recess and the longitudinal passage in the same end of the piston so as to close said passages during movement of the piston in one direction but opening said passages during reverse movement of the piston.

5. A shock absorber or vibration damper comprising, in combination with a fluid-containing cylinder provided with a low-pressure filling chamber or reservoir, a projection on one end of the cylinder extending axially into the cylinder, a rock shaft, an arm on the rock shaft, a piston in the cylinder operatively connected to the arm and having a recess which is engaged by said arm and which communicates with the reservoir, said piston also having a longitudinal lateral passage isolated from said recess and communicating at opposite ends with two transverse passages one of which is in communication with one end of the piston by means of an open longitudinal passage while the other communicates by a longitudinal passage with the opposite end of the piston, the said open passage co-operating with the projection on the end of the cylinder to give a gradually diminishing passage for the fluid during movement of the piston towards the said end of the cylinder, the piston also having a passage leading from the recess in it to one end of the piston, and a single spring-pressed plate valve mounted upon the end of the piston remote from that which co-operates with the projection on the cylinder and adapted to close the longitudinal passage at said end of the piston and also the passage leading from the recess in the piston during movement of the piston in one direction but opening said passages during movement in the opposite direction, the said piston having a resistance passage in the said valve end outside the area of the valve and leading into one of the said transverse passages.

6. A shock-absorber or vibration damped comprising, in combination with a fluid-containing cylinder, a piston therein, a chamber at one side of and integral with the cylinder, forming a unit therewith, a rock-shaft crossing the said chamber and having a transverse hole, one end being supported within a closed bearing recess in a solid or unapertured side of the chamber and the other end extending through a sleeve bearing extension of the chamber to the exterior, a gudgeon pin mounted on the piston and having a transverse passage, and an operating arm engaging said passage in the gudgeon pin and fixed within the transverse hole in the rock-shaft, the cylinder and chamber unit having an opening with which the passage in the gudgeon pin and the hole in the rock-shaft can be brought into axial alignment and through which the operating arm may be introduced endwise in order to be engaged with the hole in the rock-shaft and the passage in the gudgeon pin after said rock-shaft and pin have been positioned in the cylinder and chamber unit and in the piston respectively, with the passage in the gudgeon pin and the hole in the rock-shaft in axial alignment with said opening.

7. A shock absorber or vibration damper comprising, in combination with a fluid-containing cylinder, a piston therein, a gudgeon pin mounted on the piston and having a transverse passage a chamber integral with the cylinder to form a unit therewith, said chamber having an integral side wall provided with a closed bearing recess and also having a sleeve bearing extension on the opposite side, a rock shaft crossing said chamber and having a transverse bore, one end being supported within the closed bearing recess and the other end extending through the sleeve bearing to the exterior, an operating arm engaging the transverse passage of the gudgeon pin and engaging within the transverse bore in the rock-shaft to hold the latter against axial displacement, said arm having an annular recess situated in said hole, a securing pin member passing axially through the rock shaft and engaging by its extremity within said annular recess in the arm, and a screw device screwing into the outer end of the rock-shaft for retaining said pin member in engagement with the annular recess.

FRANK SIDEBOTHAM RIPPINGILLE.